United States Patent [19]
Lawson et al.

[11] 3,739,848
[45] June 19, 1973

[54] WATER-THICKENING POLYMER-SURFACTANT ADSORPTION PRODUCT

[75] Inventors: Jimmie B. Lawson, Houston, Tex.; Pieter F. Mijnlieff, Amsterdam, Netherlands

[73] Assignee: Shell Oil Company, New York, N.Y.

[22] Filed: May 17, 1971

[21] Appl. No.: 144,278

[52] U.S. Cl. ............................ 166/274, 252/8.55 D
[51] Int. Cl. ............................................. E21b 43/16
[58] Field of Search .................. 166/274, 275, 273; 252/8.55 D

[56] References Cited
UNITED STATES PATENTS
3,373,808  3/1968  Patton.............................. 166/275

*Primary Examiner*—Robert L. Wolfe
*Attorney*—H. W. Coryell and Harold L. Denkler

[57] ABSTRACT

An aqueous liquid is thickened by dissolving in it a substantially non-ionic polymeric material that is at least partially water-soluble and a surfactant that is ionic and combines with the polymeric material and causes it to behave like a dissolved polyelectrolyte.

7 Claims, No Drawings

WATER-THICKENING POLYMER-SURFACTANT ADSORPTION PRODUCT

BACKGROUND OF THE INVENTION

This invention relates to increasing the viscosity of an aqueous liquid, particularly one that is to be used in contact with a subterranean earth formation. Such a thickened aqueous liquid is particularly useful in connection with fluid drive oil recovery processes, processes for drilling, completing, or working over wells, or the like processes in which a thickened fluid is injected into or brought into contact with a subterranean earth formation.

Previously used thickening materials have included numerous semipolar and/or polyelectrolyte water-soluble natural or synthetic polymeric materials such as gums, sugars, polymers, etc. In general, a material dissolved in an aqueous liquid is an effective viscosity increasing material if it has a relatively large hydrodynamic volume per unit weight. The hydrodynamic volume of a material is large when the molecular weight of the dissolved material is large. But, high molecular weight materials tend to be slow in dissolving and to be readily degraded to less viscous lower molecular weight materials during their use in wells or subterranean reservoirs.

Water-soluble polymeric materials that are polyelectrolytes are generally efficient as water thickeners. In such materials, recurring units that contain similarly-charged hydrophilic ionic groups (usually anions) cause the materials to be water-soluble. The proximity of the similarly-charged ionic groups cause the dissolved molecules to be extended (and thus to have a large hydrodynamic volume) due to the repulsion between the charged groups. Examples of such polyelectrolyte thickening materials include: the Pushers and Separans (available from Dow Chemical Company) comprising partially hydrolyzed polyacrylamide polymers; bio-polymers such as the Kelsans (available from Kelco Company) and ionic polysaccharides such as the polysaccharide B-1459; (available from the U. S. Department of Agriculture) etc.

SUMMARY OF THE INVENTION

In accordance with this invention, the viscosity of an aqueous liquid is increased by dissolving in it an essentially nonelectrolytic polymeric material that contains nonionic polar groups and is at least slightly soluble in water and an amount of an ionic surfactant that combines with the polymeric material to form a condensation product that behaves like a dissolved polyelectrolyte.

The present invention is, at least in part, premised on a discovery that such ionic surfactants are adsorbed by such polymeric materials in a manner that increases the viscosity enhancing effect in an aqueous solution and that such adsorption products:

1. are stable (and substantially as efficient in viscosity enhancement as a polyelectrolyte viscosity enhancing material) in the presence of dissolved inorganic salt;
2. are stable (and substantially as efficient in viscosity enhancement as a polyelectrolyte viscosity enhancing material) at a relatively high temperatures;
3. are at least as stable as (and are possibly significantly more stable than) the polymeric material on which the surfactant is adsorbed in conditions conducive to the oxidative degradation of the polymeric material;
4. are stable in contact with crude oil;
5. are absorbed on earth formation solids only to an extent about equalling that of a polyelectrolyte viscosity enhancing material; and
6. are adapted to flow through relatively low permeability earth formation without exhibiting significant phase-plugging resistance factors, or the like.

Because of the above combination of properties, the polymer-surfactant compositions of the present invention are particularly attractive water thickening materials to be used in water that will come into contact with earth formation material. The mixing of a relatively low cost anionic surfactant and a nonionic polymer to form an adsorption product that behaves like a dissolved polyelectrolyte in an aqueous liquid may comprise a particularly economical method of thickening an aqueous liquid.

In a waterflood process for recovering oil and/or a well treating process in which oil is displaced within a subterranean reservoir by pushing it ahead of a surface active liquid that has a relatively low interfacial tension between itself and the oil to be displaced and between itself and an aqueous liquid, the displacement is improved by injecting, immediately behind the surface active liquid, an aqueous liquid solution of a polymer-surfactant combination product of the present invention.

DESCRIPTION OF THE INVENTION

The substantially nonionic polymeric material used in the present invention can comprise substantially any such material that has at least a slight water solubility. Such a material may contain some ionic groups, as long as they are too few in number to impart the properties of a water-soluble polyelectrolyte. The essentially nonionic polymeric materials used in the present process can comprise substantially any polyalkoxylated organic material such as the polyethoxylated and/or polypropoxylated aliphatic, aromatic, or alicylic, alcohols, such as the natural gums or resins e.g., the Guar gums, carboxymethylcellulose, the polyacrylic acid esters, the polyvinyl esters or ethers, the polystyrl esters or ethers, or the like. Examples of commercially available materials include Neodols (polyethoxylated aliphatic alcohols available from Shell Chemical Company) Polyoxs (polyethylene oxide polymers available from Union Carbide) the Pluronics (comprising base units of polypropylene oxide with ions of polyethylene oxide tips, available from Wyandotte Chemical Company), or the like. The essentially nonionic polymeric materials can be used in the form of mixtures or substantially pure materials.

The ionic surfactant used in the present process may comprise substantially any anionic or cationic surfactant or mixture of surfactants that tend to affect the properties of the surface of a liquid or solid by concentrating in a surface layer such as at the interface between oil and water phase liquids. Such surfactants may contain various polar groups in addition to their anionic or cationic groups and preferably have hydrocarbon chains (aliphatic, aromatic or alicyclic) containing in the order of about 16 carbon atoms. Surfactants such as the sulfonates, sulfates, and/or carboxylates of aromatic aliphatic, or alicyclic alkoxylated hydrocarbons and similarly-sized quaternary ammonium salts are generally suitable, with the anionic surfactants being the preferred surfactants. Examples of commercially available anionic surfactant materials include the Neodol sulfates (ethoxylated aliphatic alcohol sulfates available from Shell Chemical Company) sodium salts of petroleum sulfonates such as Petronates (available from Witco Company), the Mahogany sulfonates, the Green sulfonates, or the like, the soaps of fatty acids, the soaps of tall oil heads, and the like.

In general, the nonionic polymeric material and the anionic surfactant may be combined before, during, or after their dissolution in aqueous liquid. In special situations in which a thickened aqueous liquid is being employed to displace oil within a subterranean reservoir, a slug of aqueous solution containing only the surfactant can be injected ahead of a slug of aqueous solution containing only the polymeric material (or containing the polymeric material but less than enough surfactant to cause it to act like a dissolved polyelectrolyte) so that two fluids mix within the reservoir to form an aqueous solution of increased viscosity at a location spaced away from the injection well.

With respect to a particular surfactant and polymeric material, the amount of surfactant that combines and causes the polymeric material to act like a polyelectrolyte can be determine by determining the effect of the surfactant on the cloud point of the polymeric material. The solubility of a nonionic polymeric material usually decreases with increasing temperature. The phase separation temperature is called the cloud point. For example, with a polyethylene oxide such as Polyox WSR-301, the cloud point is at about 96° C. A possible mechanism for such a decreasing solubility is a disappearance of the bonding between the ether linkages and water (hydrogen bonding) when the temperature increases to one at which this attraction can no longer compensate for the attraction between the hydrocarbon groups (hydrophobic bonding) of the polymer chain. When an ionic surfactant is added, hydrophobic bonding occurs between the apolar portions of the polymer chain and the apolar portions of the surfactant. The adsorbed surfactant converts the polymer into a polyelectrolyte by, in effect, providing the polymer with anionic groups. Because of the strong polarization of the water by these ionic groups and because they create a mutual repulsion between the polymer molecules, the combination or adsorption products tend to be much more soluble and to undergo a coil expansion with an attendant increase in the viscosity of the water in which they are dissolved.

EXAMPLE I — VISCOSITY ENHANCEMENT

In the following tests, viscosities were measured in Brookfield cylindrical couette and cone and plate type viscometers. Unless otherwise stated, the shear rates used were 7 sec$^{-1}$.

With solutions containing 1,000 ppm Polyox WSR-301 and about 0.1 to 0.5 weight percent of the surfactant sodium lauryl sulfate in distilled water at 25° C, the viscosity rose substantially linearly from about 2 to 30 centipoises and then remained substantially unaffected by further increases in surfactant concentrations. In similar experiments with 500 parts per million Polyox, the substantially linear rise occurred at surfactant concentrations of from about 0.1 to 0.35 percent by weight. The viscosity increases ranged from about 2 to 12 centipoises.

Sodium lauryl sulfate is a good foaming agent and the foaming properties of the tested solutions (as well as implication of the viscosity enhancement properties) indicate that the polymer becomes saturated with adsorbed surfactant. Significant foaming of the solutions did not occur at surfactant concentrations below the plateau regions. Such a lack of foaming (where the surfactant should have been capable of causing foaming at much lower concentrations than were present) suggests that there was little or no free surfactant in solution.

Similar tests were made with the same polymer and sodium dodecyl benzene sulfonate. At 1,000 parts per million polymer concentration, a generally linear rise in viscosities from about 5 to 28 centipoises occurred at surfactant concentrations of from about 0.1 to 0.25 percent. With 500 parts per million of the polymer, the viscosity rise was from about 3 to 9 centipoises at surfactant concentrations of from about 0.05 to 0.2 percent. With polymer concentrations of 250 parts per million, the viscosity rise was from about 2 to 5 centipoises at surfactant concentrations of from about 0.05 to 0.1 percent.

In similar experiments with the same polymer and Bryton 430 petroleum sulfonate, at a polymer concentration of 1,000 parts per million, the viscosity rise was substantially continuous from 4 to 16 centipoises at surfactant concentrations of from about 0 to 1.0 percent by weight. With the polymer concentration of 500 parts per million, the rise was linear from about 2½ to 7 centipoises at surfactant concentrations of from about 0 to 0.5 percent by weight and, at a surfactant concentration of about 0.5 percent, a plateau was reached with respect to the viscosity enhancement. In comparing the petroleum surfactant to the sodium lauryl sulfate and sodium dodecyl benzene sulfonate it should be noted that the petroleum sulfonate is only 60 percent active ingredient with the remainder being a mineral oil of about the same molecular weight.

EXAMPLE II — OXIDATIVE DEGRADATION

Polymer surfactant systems such as those formed in Example I tend to suffer viscosity losses upon standing for several minutes at a relatively elevated temperature such as 70° C. It is known that polymers such as Polyox undergo oxidative degradation and that such degradation can be suppressed by antioxidants. As indicated by the experimental results shown in Table 1, the viscosity loss of the present type of polymer-surfactant combination products is surpressed by antioxidants that inhibit the degradation of the polymer.

The problem of oxidation is particularly important with respect to the polyethers such as Polyox. There are indications of a chemical shift in the protons of a polyethylene oxide in the presence of an adsorbed surfactant and indications that the combination formed by such an adsorption remains stable at relatively high temperatures. It thus appears that an anionic surfactant adsorbed on or along side a polymer chain tends to retard the oxidation of the polymer chain and probably to impart improved mechanical strength. This may be important in providing greater shear stability. Shear degradation is an important consideration of the durability of polymer thickened aqueous liquids used in drilling operations, fluid injections, and the like.

TABLE 1
VISCOSITIES OF POLYOX SOLUTIONS BEFORE AND AFTER HEATING

| Conc. of Polyox WSR 301 (ppm) | Anti-oxidant | Conc. of Anti-oxidant | Conc. of Sur-fact-ant | Viscosity at 23°C (cp) | Viscosity at 23°C after 2 hrs heating at 70°C |
|---|---|---|---|---|---|
| 2000 | none | — | — | 10 | 4 |
| 2000 | $Na_2S_2O_3$ | 0.5% | — | 9 | 9 |
| 2000 | IPA | 5% | — | 11 | 12 |
| 1000 | none | — | — | 4 | 3 |
| 1000 | none | — | 0.5% NaDDBS | 19 | 3.5 |
| 1000 | $Na_2S_2O_3$ | 0.5% | 0.5% NaDDBS | 7 | 6 |
| 1000 | IPA | 5% | 0.5% NaDDBS | 10 | 8 |
| 1000 | none | — | 1% NaLS | 29 | 25 |
| 1000 | none | — | 1% NaLS + 0.3M NaCl | 7.5 | 7.0 |

Na DDBS = sodium dodecylbenzene sulfonate
Na LS = sodium lauryl sulfate

EXAMPLE III — INTERACTION WITH OIL SAND

The combination products such as those of Polyox and the surfactants described in Example I have been found to be stable in contact with crude oil. A series of aqueous solutions containing such combination products were prepared and placed in contact with disaggregated Berea sandstone in order to determine qualitatively whether or not the combination products are stable (rather than having either or both of their components so extensively adsorbed as to render such thickening agents impractical for use as mobility control agents in chemical flood oil recovery processes). In such experiments, the fluid to rock ratio was 1 to 1. After sufficient time to establish equilibrium (2 days) the samples were centrifuged and the supernatent liquid was decanted and subjected to viscosity measurements. The results are shown in Table 2.

Table 2
VISCOSITIES OF POLYMER SOLUTIONS AFTER EQUILIBRATION WITH SANDSTONE

| Polymer | Solution concentration | Initial viscosity, cp | Viscosity after equilibration with rock |
|---|---|---|---|
| Pusher 520 | 250 ppm | 30 | 14 |
| Polyox WSR 301 | 1000 ppm | 4 | 2.5 |
| Polyox WSR 301 + Na DDBS | 1000 ppm + 0.5% | 19 | 10 |

In the rock-adsorption test, an aqueous solution thickened by Pusher 520 was used as a control. The tests demonstrate that the viscosity of a commercially available thickener undergoes similar decreases due to rock-adsorption. Evidence that indicated viscosity decreases are due to adsorption rather than some type of interaction with dissolved salts from Berea sandstone was obtained by using solutions of Pusher and Polyox surfactant thickened water in water that had been shaken with the Berea sandstone. The adsorption of the Polyox WSR-301 plus sodium dodecyl benzene sulfonate resulted in a viscosity loss of 50 percent about the same percentage loss was observed for both the 1,000 parts per million solution of Polyox alone and the 250 parts per million solution of Pusher 520.

In a simulated reservoir flooding test, a solution of 1,000 parts per million Polyox and 0.5 percent sodium dodecyl benzene sulfonate was injected into a consolidated Berea sandstone core that was 25 centimeters long, 5 centimeters in diameter, and had a permeability of 807 millidarcies. The polymer solution contained 0.025 moles sodium chloride and had an initial viscosity of 10 centipoises. After about 2 pore volumes were injected into the core, the viscosity of the produced fluid rose to 10 and remained there during the injection of an additional 2 pore volumes. The flow rate through the core (at 5 pounds per square inch pressure drop) corresponded to an effective solution viscosity of 10.8 centipoises. The flow rate remained constant after polymer breakthrough. The results indicate that there was no phase plugging and no resistance factor.

What is claimed is:

1. A process for displacing oil within a subterranean reservoir, comprising:
    injecting into the reservoir a slug of surface active liquid that has a relatively low interfacial tension between it and the oil to be displaced and between it and an aqueous liquid; and
    injecting immediately behind said surface active liquid an aqueous liquid solution of:
    substantially nonelectrolytic polymeric material that contains nonionic polar groups and is at least slightly water-soluble; and
    an amount of ionic surfactant that combines with said polymeric material and forms a combination product that behaves in solution as a dissolved polyelectrolyte.

2. In a process for contacting a material located within a subterranean earth formation with a thickened aqueous liquid, the improvement which comprises:
    extending at least one conduit into the subterranean earth formation; and
    injecting through said conduit an aqueous liquid solution consisting essentially of water, an essentially nonelectrolytic polymeric material that contains nonionic polar groups and is at least slightly water-soluble, and an amount of ionic surfactant material that combines with said polymeric material and forms a combination product that behaves like a dissolved polyelectrolyte.

3. The process of claim 2 in which said polymeric material is a polyalkoxylated organic material.

4. The process of claim 2 in which said surfactant is a polyalkoxylated alcohol sulfate.

5. The process of claim 2 in which said surfactant is a petroleum sulfonate.

6. The process of claim 2 in which said surfactant is a soap of at least one carboxylic acid.

7. The process of claim 2 in which said aqueous liquid is injected into an oil-containing subterranean earth formation to displace oil within the earth formation.

* * * * *